United States Patent [19]
Virginio et al.

[11] Patent Number: 5,245,429
[45] Date of Patent: Sep. 14, 1993

[54] SELECTIVE DATA BROADCASTING RECEIVER ADAPTER APPARATUS AND METHOD FOR PERSONAL COMPUTERS

[75] Inventors: Ratti Virginio, Nibionno; Riva Emilio, Erba, both of Italy

[73] Assignee: International Business Machines Corporation, Armonk, N.Y.

[21] Appl. No.: 808,862

[22] Filed: Dec. 17, 1991

[51] Int. Cl.$^5$ .................................................. H04N 7/08
[52] U.S. Cl. ..................................... 358/142; 358/903
[58] Field of Search ................. 358/142, 903, 188, 86; 364/521

[56] References Cited

U.S. PATENT DOCUMENTS

| | | | |
|---|---|---|---|
| 4,554,660 | 11/1985 | Noirel et al. | 358/142 |
| 4,595,952 | 6/1986 | Filliman | 358/142 |
| 4,829,569 | 5/1989 | Seth-Smith et al. | 358/86 |
| 4,920,503 | 4/1990 | Cook | 358/903 |
| 5,038,211 | 8/1991 | Hallenbeck | 358/142 |
| 5,038,212 | 8/1991 | Van Den Hombergh et al. | 358/142 |
| 5,070,404 | 12/1991 | Bullock et al. | 358/142 |

*Primary Examiner*—John K. Peng
*Assistant Examiner*—John W. Miller
*Attorney, Agent, or Firm*—Michael J. Buchenhorner

[57] ABSTRACT

The present invention relates to a microcontroller based adapter card that interfaces a Micro Channel bus architecture to allow a personal computer implementing such hardware architecture to tune on a TV channel and capture digital data transmitted intermixed with an analog video signal used for diffusion of television programs. The receivers of such transmission system receive the incoming data stream, transmitted via "on air" or "cable" channels, through a TV cable of a broadcasting network or from the aerial antenna. Received serial data is decoded and stored into byte format for processing which is partially done by the on-board processor and then by the personal computer processor. This processing will result in storing data as records, messages and files formats into the personal computer mass storage devices. The on-board intelligence allows selectivity of transmitted data by checking the incoming addressing bytes (transmitted in the same data packet) against the card unique address or group membership parameter stored in non-volatile devices.

2 Claims, 1 Drawing Sheet

SELECTIVE DATA BROADCASTING RECEIVER ADAPTER APPARATUS AND METHOD FOR PERSONAL COMPUTERS

PRIORITY INFORMATION

This application is the U.S. counterpart to priority patent application Ser. No. 0/90124488.9 filed in Italy on Dec. 18, 1990.

BACKGROUND OF THE INVENTION

The invention applies to the field of data transmission based on a unidirectional broadcast system and more specifically refers to an adapter which implements the receiver function of the system.

U.S. Pat. No. 4,829,569 discloses a subscription television system in which individual decoders are enabled to receive individually addressed messages. However, the cited prior art patent does not teach how to organize for a selective transmission of data or how to selectively receive such data. According to the prior art, individual decoders in a subscription television system can be addressed for transmission of either billing information or individual messages; this suggests only a distinction between a transmission directed to a single addressee and a broadcasting transmission. The same scheme may be applied to non subscription television, substituting the decoders With a special-purpose device.

BRIEF SUMMARY OF THE INVENTION

In accordance with one embodiment of the present invention, a personal computer adapter card for receiving data transmitted by a broadcast station is disclosed. The broadcast station is in a unidirectional broadcasting system using a TV channel which transmits digitally encoded data according to a predetermined protocol. The adapter card is intended for use in a host personal computer including a host processor. The adapter card includes a tuning circuit for tuning and demodulating a TV channel signal which includes digitally encoded data superimposed on a TV composite signal. The card further includes a separating circuit, coupled to the tuning circuit, for separating the digitally encoded data from the TV composite signal. The card also includes a programmable decoder circuit, coupled to the separating circuit, for recognizing, receiving and storing the digitally encoded data. The card employs a non-volatile memory for storing unique information relating to a selective transmission directed to a particular end-user or to a group of end-users. The card also includes a processing circuit for controlling the tuning circuit and the programmable decoder circuit and for processing the digitally encoded data. The card employs a shared data buffer circuit, coupled between the processing circuit and the host computer, for storing the digitally encoded data and communication information so as to permit concurrent operation by the processing circuit on the adapter card and the host processor in the host computer. In this manner, data receiving throughput is increased.

The subject adapter is a microcontroller based card which interfaces with a Micro Channel bus architecture to allow a personal computer using such architecture to tune on a TV channel and capture the digital data transmitted with the analog video signal.

In accordance with the present invention, the physical data transmission medium is the unidirectional broadcasting system used for distribution of television programs. The receivers of such transmission system receive the incoming data stream, transmitted via "on air" or "cable" channels through a TV cable of a broadcasting network or from the aerial antenna.

According to the present invention, the received serial data is decoded and stored into byte format for processing which is partially done by an on-board processor and then by the host. This processing will result in storing data as records, messages and file formats into the personal computer mass storage devices.

Data consists of a plurality of variable length messages from one or many information-providers to one or more end-users over a broadcast or multicast transmission system.

The on-board intelligence allows the selection of transmitted data by checking the incoming addressing bytes (transmitted in the same data packet) against the card unique address or group membership parameter stored in non-volatile storage.

This process refers to a general "selectivity scheme" implemented in a given transmission protocol which is intended to give the information-providers the ability of addressing each single end-user or grouping any subset of those end-users which are likely receiving the same data.

The addressing selectivity is dynamically modifiable by the remote information-provider by sending control packets to explicitly enable/disable the receiving capability of the adapters as well as explicitly change the end-user group membership.

The above-mentioned "selectivity scheme" is also described in the co-pending European Patent Application titled "Selective data distribution method using unidirectional broadcast or multicast transmission" filed by the same Applicant.

It is therefore an object of the invention as claimed to overcome the above drawbacks of the prior art. For a better understanding of the present invention, together with other and further advantages and features thereof, reference is made to the following description and to the accompanying drawing, the scope of the invention being pointed out in the appended claims.

DETAILED DESCRIPTION OF THE INVENTION

I. Hardware Description

Figure 1:
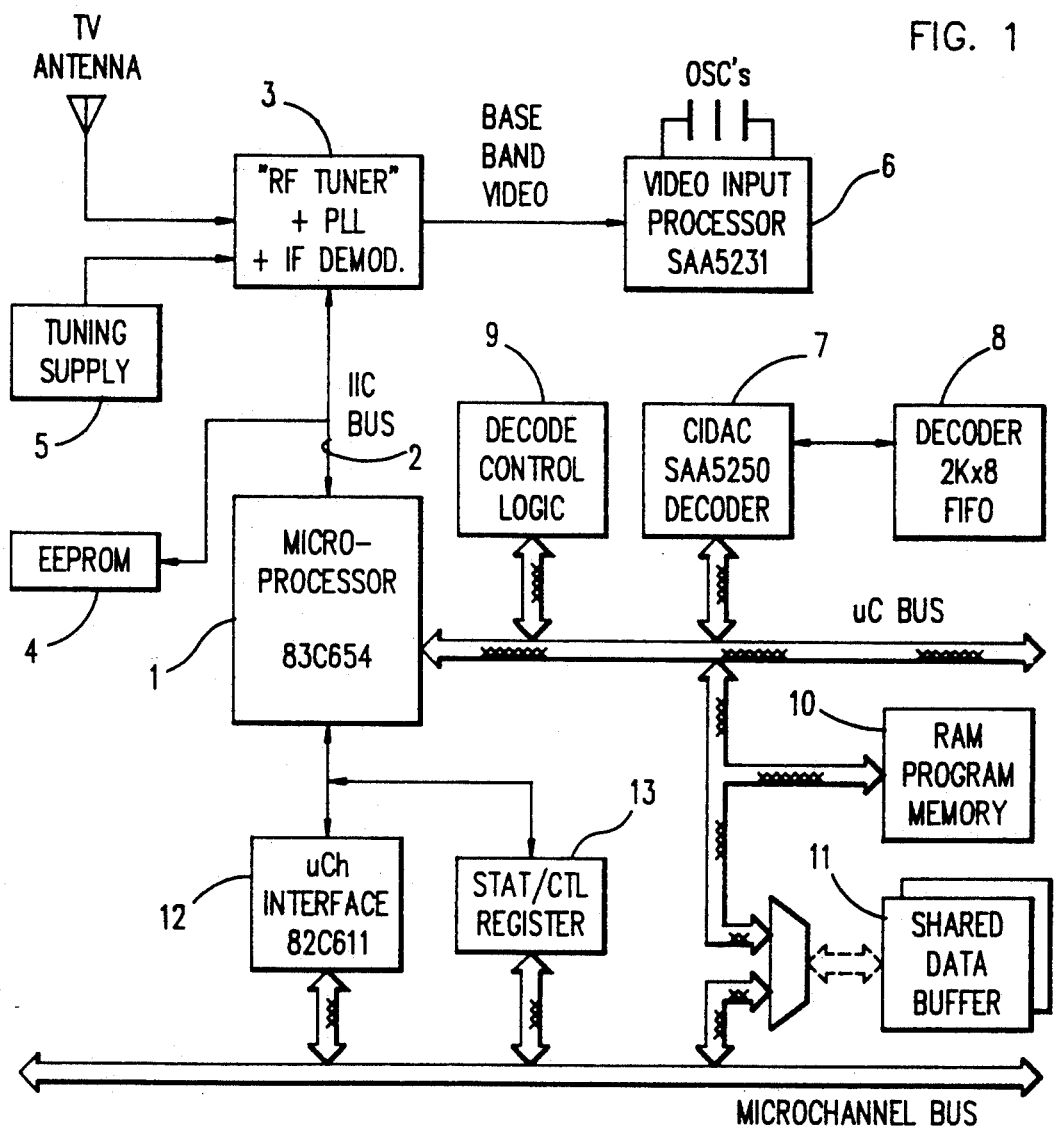
FIG. 1 shows a block diagram of the data broadcasting receiver board according to the present invention.

The adapter hardware is specifically conceived to be interfaced to a personal computer Micro Channel bus architecture and fits into the subcategory of an "8-bit Slave Adapter" implementing all the related logic, such as Programmable Option Select registers, Addressing and Interrupt systems, and Card Setup mechanism (all characteristics of the Micro Channel bus architecture). On the other side, a hardware set for Teletext based applications is implemented to allow direct connection to coaxial cables carrying the RF-Video signal where digital data is intermixed. Typically this cable comes from a TV antenna or a cable TV network. This set of devices including the RF Tuner, IF demodulator, Teletext Video Processor and Data Decoder C.I.D.A.C. (manufactured by Philips) represents the 'Front-end hardware' as set forth in the following description. A predetermined amount of memory is available on the board with the purpose of storing the adapter code (Program memory), the received and processed data bytes (Data Buffer) and nonvolatile data for user selectivity and data protection (EEPROM).

With reference to the block diagram in the FIG. 1 the following major functional blocks are described:

The 83C654 single-chip 8-bit microcontroller (1), sold by Philips, is an advanced CMOS derivative of the 8051 microcontroller family. With respect to its originator 8051 core CPU, it exhibits enhanced features such as:

16K×8 ROM, externally expandable to 64K bytes.
256×8 RAM, externally expandable to 64K bytes.
Two 16-bit timer/counters—Embedded IIC bus controller.

The IIC bus feature (2) is particularly suitable for the present application because of the presence of two IIC bus compatible devices an RF: Tuner phases locked loop, or PLL (3) and EEPROM (4).

The microprocessor is clocked by a 16 MHz crystal that allows 58% of instructions to be executed in 750 nsec. and 42% in 1500 nsec.

The 'Front-end' hardware includes: the RF-Tuner (3) with PLL frequency synthesis which performs the function of tuning and demodulating of TV signal to obtain the base band video signal. A Tuning Supply (5) supplies the tuning voltage.

The Front End hardware also includes a Video Input Processor SAA5231 (6), (manufactured by Philips) which performs the extraction of digital data from analog composite video signal and the bit serialization and synchronization. This device has a free running oscillator driven by an external crystal of 13.875 MHz which is twice the frequency of the received bits.

The Front End hardware further includes a C.I.D.A.C. Decoder SAA5250 (7) which performs the function of recognizing and storing the bit streams belonging to the desired logic channel. It is programmable by the 83C654 processor (1) for different types of communication protocol standards.

The Front End hardware also employs a C.I.D.A.C Decoder (7) stores the received data bytes into its local 2K×8 FIFO memory (8). C.I.D.A.C. Decoder (7) has a private 2K×8 FIFO memory (8) for received and decoded bytes. This memory is handled by the C.I.D.A.C. Decoder as a FIFO queue to allow the processor (1) to retrieve data in the same received sequence. Processor (1) has no access to FIFO memory (8); instead it reads the available byte from a register 'Fifodata' included in C.I.D.A.C. Decoder (7). It also checks the FIFO status (empty, data available, full) by reading the C.I.D.A.C 'Fifostatus' register.

Control and Decode Logic (9) provides the hardware logic having the function of decoding the addressing, controlling the transfer and other hardware functions.

The on-board memory resources include a 32K×8 RAM program memory (10) to extend the program space of processor (1) up to 48K bytes of total code area and two banks of 16K×8 RAM Shared data buffers (11) to store intermediate packets and communication information between the on-board processor (1) and the host processor of the personal computer. The RAM program memory (10) gives the flexibility of code download for algorithm updating and maintenance aspects, while the Shared data buffers (11) allow concurrent operations of the two processors without stopping each others activities and also increase the buffer size in order to maintain receiving data throughput as high as possible.

2K×8 EEPROM (4) is the non-volatile portion of the adapter memory resources for storing permanent information like unique hw-id, group-membership-id parameters and so forth. The above bytes must reside on the board to assure a sufficient level of protection for vital data on which the selectivity scheme is based upon. Only the on-board processor (1) has access to that data via the IIC bus (2).

Most of the logic to interface the host Micro Channel bus reside in the 82C611 chip (12), manufactured by Chips & Technology, which supports the following functions which are typical of the Micro Channel architecture:

I/O and Memory slave adapters control logic.
Programmable Option Select (POS) support including:
  Adapter ID
  Flexible I/O and Memory relocation
  POS port Decode and Handshaking
Command and Status decoding
Response signal generation
Full bus timing specification compatibility Status/Control Registers (13) are two resources accessed by the host processor to check the status and to control specific configuration transitions of the adapter hardware. The receiver board, according to the invention, implements a Slave type adapter in the sense that the memory resources and the Status/Control registers (13) are mapped into the personal computer memory space which is relocatable via the POS registers and the Adapter Descriptor File (ADF) facilities.

This is the key way used by the user application programs for exploiting the on-board hardware resources by sending commands and retrieving the received data.

II. Operation Overview

The operation of the adapter is totally under control of the on-board processor (1) which receives commands from the user program, via the "application interface layer" of the transmission protocol, and executes these commands for receiving the desired TV channel, decoding the captured data and handling the error protection/correction bytes. These preprocessed data are then passed to the upper software layers for final processing.

The IPL and Power On Tests functions are handled by the code resident in the masked ROM of processor (1). High test coverage and failure isolation is achieved due to the processor's access to almost all the functional devices. At the end of diagnostic tests the functional code is downloaded to the program RAM under control of the host computer processor and the adapter enters the ready status for data reception. The host device driver code passes the required parameters to the adapter code that starts programming of the tuner PLL device (3) and C.I.D.A.C. decoder (7) to get the data from the desired TV channel and logical protocol link. Data streams (packets) are then retrieved from decoder FIFO (8) by processor (1) and error handling routines are entered by checking the 'Hamming-protected' and 'CRC-protected' bytes.

This process implements the 'Data Link' algorithm. At this point the true functional processing of received bytes starts and the protocol 'Network layer' algorithm begins. This algorithm is based upon the card unique-id's and group membership parameters which are stored in non-volatile way in EEPROM memory (4). The task is totally carried out by microcode which can reside on the adapter program RAM or on the computer host processor system memory. In any case the received packets are then passed to the software upper levels to finally present data to the user application.

Hardware level synchronization is obtained by the Interrupt mechanism in both directions, host to adapter and adapter to host, and by the Status/Control registers (13). Beside these hardware resources it is possible to use a code level information exchange by means of Shared data buffers (11) which are accessible by the two processors. On the base of this shared memory resource, called 'Communication Area' it is possible to implement a handshake mechanism for processors operation optimization and synchronization.

What is claimed is:

1. A personal computer (PC) adapter card for receiving data transmitted by a broadcaster in a broadcast station in a unidirectional broadcasting system using a TV channel which transmits digitally encoded data according to a given protocol, said adapter card being adapted for use in a host personal computer including a host processor, said adapter card comprising:

tuning means for tuning and demodulating a TV channel signal which TV channel signal includes digitally encoded data superimposed on a TV composite signal and addressing information for identifying a particular end-user or to a group of end-users;

separating means, coupled to said tuning means, for separating said digitally encoded data from said TV composite signal;

programmable decoder means, coupled to said separating means, for recognizing, receiving and storing said digitally encoded data;

a non-volatile memory, coupled to the programmable decoder means, for storing unique identification information relating to a selective transmission directed to the particular end-user or to a group of end-users for selecting data from the TV channel signal by checking the addressing information against the unique identification information;

processing means for controlling said tuning means and said programmable decoder means and for processing said digitally encoded data;

shared data buffer means, coupled between said processing means and said host personal computer, for said digitally encoded data and communication information so as to permit concurrent operation by said processing means on said adapter card and the host processor in said host computer, whereby data receiving throughput is increased.

2. A method implemented in an adapter card for a host personal computer for selectively receiving digitally encoded data transmitted by a broadcast station in a unidirectional transmission system using a TV channel signal, said method comprising the steps of:

tuning a selected TV channel signal;

decoding encoded digital data signals which are superimposed on said selected TV channel signal according to a predetermined transmission protocol, thus producing decoded data signals, said encoded digital data signals including addressing information which indicates a particular adapter card for which said encoded digital data signals are intended;

storing and updating unique identification parameters relating to a selective transmission according to said transmission protocol;

retrieving said decoded data signals;

checking said addressing information against selectivity parameters stored in a memory situated on said adapter card;

performing error detection and correction on said decoded data signals thus producing final data, and storing said final data in a data buffer which is shared by a processor on said adapter card and a host processor included in said host computer.

* * * * *